(12) United States Patent
Delp et al.

(10) Patent No.: US 9,897,253 B2
(45) Date of Patent: Feb. 20, 2018

(54) TEMPERATURE CONTROLLED AXLE COOLING SYSTEM AND METHOD

(71) Applicant: DEERE & COMPANY, Moline, IL (US)

(72) Inventors: Ethan H Delp, Dubuque, IA (US); Justin J Turnis, Manchester, IA (US)

(73) Assignee: DEERE & COMPANY, Moline, IL (US)

( * ) Notice: Subject to any disclaimer, the term of this patent is extended or adjusted under 35 U.S.C. 154(b) by 327 days.

(21) Appl. No.: 14/873,421

(22) Filed: Oct. 2, 2015

(65) Prior Publication Data

US 2017/0096115 A1    Apr. 6, 2017

(51) Int. Cl.
| | | |
|---|---|---|
| B60R 17/02 | (2006.01) | |
| F16N 39/06 | (2006.01) | |
| F16N 7/40 | (2006.01) | |
| F16N 39/02 | (2006.01) | |
| F01M 5/00 | (2006.01) | |

(52) U.S. Cl.
CPC ............ *F16N 7/40* (2013.01); *F16N 39/02* (2013.01); *F16N 39/06* (2013.01); *F01M 5/005* (2013.01)

(58) Field of Classification Search
CPC ... F16N 7/38; F16N 7/40; F16N 39/02; F16N 39/06; F01M 1/10; F01M 5/005; B60B 35/00; F16H 57/0443; F16H 57/0483
See application file for complete search history.

(56) References Cited

U.S. PATENT DOCUMENTS

| | | | |
|---|---|---|---|
| 4,352,301 A * | 10/1982 | Fleury | ................ F16H 57/0434 184/6.12 |
| 6,199,663 B1 | 3/2001 | Roy et al. | |
| 8,739,932 B2 | 6/2014 | Ramler | |
| 2003/0188937 A1 | 10/2003 | Schneider et al. | |
| 2014/0097043 A1* | 4/2014 | Hoshinoya | .......... F16H 57/0405 184/6.4 |
| 2014/0243137 A1 | 8/2014 | Kwasniewski et al. | |
| 2016/0160713 A1* | 6/2016 | Reedy | ...................... F01M 1/02 184/6.28 |

* cited by examiner

*Primary Examiner* — William E Dondero
*Assistant Examiner* — Robert T Reese
(74) *Attorney, Agent, or Firm* — Taft Stettinius & Hollister LLP; Stephen F. Rost (57) ABSTRACT

A temperature controlled axle cooling system and method is disclosed. Axle hydraulic circuits cool oil circulating through vehicle axles, and sensors monitor axle temperatures. Pumps are activated to circulate the oil through the axle circuits based on the axle temperatures. Each axle circuit can be a separate closed-loop hydraulic system, not sharing fluid with any other vehicle or axle hydraulic systems. All axle cooling system pumps can be activated when any axle temperature exceeds a high threshold. All pumps can be deactivated when all axle temperatures are below a low threshold. Each pump can be activated and deactivated based only on that axle's temperature. The axle cooling system pumps can be driven by motors powered by the main vehicle hydraulic system flow. A valve can be controlled based on axle temperature to allow main vehicle hydraulic system flow. Multiple pumps can be driven by a single motor.

20 Claims, 4 Drawing Sheets

TEMPERATURE CONTROLLED AXLE COOLING SYSTEM AND METHOD

FIELD OF THE DISCLOSURE

The present disclosure relates generally to the field of motorized machinery, and more specifically to a temperature controlled axle cooling system for a vehicle.

BACKGROUND

Work machines, for example articulated dump trucks, have several axles that can heat up during operation from braking and other heat generating tasks. Axle oil flows through the axles to lubricate and cool the axle components. The axle oil has a preferred operating temperature range for most effective use. Excessive heating of the axle oil as well as excessive cooling of the axle oil can be detrimental to the axle oil, as well as to bearings, seals and other axle components. During testing, it was also found that while operating at cold temperatures (for example 25° C.), vacuum levels on the axle suction lines can exceed supplier recommendations.

Typically an axle cooling system will run at all times while the engine is running because the pump that drives the axle cooling system is driven off the engine. This results in constant fuel burn with an added load on the engine, and can cause unnecessary cooling of the axles when the axle oil is not up to the preferred operating temperature range.

It would be desirable to have an axle cooling system that could be activated and deactivated depending on the axle oil temperature.

SUMMARY

A temperature controlled axle cooling system for an axle of a vehicle is disclosed, where the temperature controlled axle cooling system includes an axle hydraulic circuit, a pump, an axle oil cooler and a temperature sensor. The axle hydraulic circuit passes through the axle, and the pump circulates axle oil through the axle hydraulic circuit. The axle oil cooler cools the axle oil as it circulates through the axle hydraulic circuit, and the temperature sensor monitors an axle temperature of the axle. When the temperature sensor indicates that the axle temperature is above a high axle temperature threshold, the pump is activated to circulate axle oil through the axle hydraulic circuit. When the temperature sensor indicates that the axle temperature is below a low axle temperature threshold, the pump can be deactivated. The axle cooling system can also include an axle oil filter that filters the axle oil as it circulates through the axle hydraulic circuit, and a bypass circuit that monitors a hydraulic pressure in the axle hydraulic circuit between the pump and the axle oil filter; such that when the hydraulic pressure is less than a pressure threshold, the axle oil circulates through the axle oil filter; and when the hydraulic pressure is not less than the pressure threshold, the axle oil bypasses the axle oil filter.

A temperature controlled axle cooling system is disclosed for a vehicle having a main vehicle hydraulic system, a first axle and a second axle. The temperature controlled axle cooling system includes first and second axle hydraulic circuits, first and second pumps, first and second axle oil coolers, and first and second temperature sensors. The first axle hydraulic circuit passes through the first axle, and the second axle hydraulic circuit passes through the second axle. The first pump circulates axle oil through the first axle hydraulic circuit, and the second pump circulates axle oil through the second axle hydraulic circuit. The first axle oil cooler cools the axle oil as it circulates through the first axle hydraulic circuit, and the second axle oil cooler cools the axle oil as it circulates through the second axle hydraulic circuit. The first temperature sensor monitors a first axle temperature of the first axle, and the second temperature sensor monitors a second axle temperature of the second axle. The first and second pumps are activated to circulate axle oil through the first and second axle hydraulic circuits based on the first and second axle temperatures. The first axle hydraulic circuit can be a closed-loop hydraulic system; the second axle hydraulic circuit can be a separate closed-loop hydraulic system, where neither the first or second axle hydraulic circuits share hydraulic fluid with the main vehicle hydraulic system.

The cooling system can also include an axle cooling system controller that receives first axle temperature readings from the first temperature sensor and second axle temperature readings from the second temperature sensor. The axle cooling system controller can activate both the first and second pumps when either of the first or second axle temperature readings is above a high axle temperature threshold. The axle cooling system controller can deactivate both the first and second pumps when both the first and second axle temperature readings are below a low axle temperature threshold, the low axle temperature threshold being less than the high axle temperature threshold. The axle cooling system controller can activate the first pump when the first axle temperature reading is above a first high axle temperature threshold; and activate the second pump when the second axle temperature reading is above a second high axle temperature threshold.

The axle cooling system can also include a first motor coupled to the first pump to drive the first pump, a second motor coupled to the second pump to drive the second pump, and an on/off valve coupled to the first motor, such that when either of the first or second axle temperature readings is above the high axle temperature threshold, the axle cooling system controller opens the on/off valve which activates the first motor to drive the first pump, and return flow from the first motor activates the second motor to drive the second pump. The on/off valve can be coupled to the main vehicle hydraulic system; and when the on/off valve opens hydraulic fluid flow from the main vehicle hydraulic system can flow through the on/off valve, power the first and second motors and return to the main vehicle hydraulic system.

The vehicle can also include a third axle, and the axle cooling system can also include a third axle hydraulic circuit, a third pump, a third axle oil cooler and a third temperature sensor. The third axle hydraulic circuit can pass through the third axle, where the third axle hydraulic circuit is a separate closed-loop hydraulic system, and the third axle hydraulic circuit does not share hydraulic fluid with the main vehicle hydraulic system. The third pump can circulate axle oil through the third axle hydraulic circuit, the third axle oil cooler can cool the axle oil as it circulates through the third axle hydraulic circuit, and the third temperature sensor can monitor a third axle temperature of the third axle. The axle cooling system controller can receive first axle temperature readings from the first temperature sensor, second axle temperature readings from the second temperature sensor and third axle temperature readings from the third temperature sensor. When either of the first, second or third axle temperature readings is above a high axle temperature threshold, the axle cooling system controller can open the on/off valve which activates the first motor to drive the first pump, and return flow from the first motor can activate the second motor to drive the second and third pumps. The on/off valve can be coupled to the main vehicle hydraulic system; such that when the on/off valve opens hydraulic fluid flow from the main vehicle hydraulic system flows through the on/off valve, powers the first and second motors and return flow from the second motor returns to the main vehicle hydraulic system.

A temperature based method is disclosed for controlling an axle cooling system for a vehicle having a main vehicle hydraulic system, a first axle and a second axle. The method includes circulating axle oil in a first axle hydraulic circuit that passes through the first axle; circulating axle oil in a second axle hydraulic circuit that passes through the second axle; cooling the axle oil in the first axle hydraulic circuit as it circulates in the first axle hydraulic circuit; cooling the axle oil in the second axle hydraulic circuit as it circulates in the second axle hydraulic circuit; monitoring a first axle temperature that indicates a temperature of the axle oil in the first axle hydraulic circuit as it passes through the first axle; monitoring a second axle temperature that indicates a temperature of the axle oil in the second axle hydraulic circuit as it passes through the second axle; and circulating the axle oil in the first axle hydraulic circuit and circulating the axle oil in the second axle hydraulic circuit based on the first and second axle temperatures.

Circulating axle oil in the first and second axle hydraulic circuits based on the first and second axle temperatures can include tracking an uninterrupted length of time that the first axle temperature exceeds a high temperature threshold; tracking an uninterrupted length of time that the second axle temperature exceeds the high temperature threshold; and circulating the axle oil in the first axle hydraulic circuit and circulating the axle oil in the second axle hydraulic circuit when the tracked uninterrupted length of time that at least one of the first and second axle temperatures exceeds the high temperature threshold is greater than a high temperature time duration.

The method can also include tracking an uninterrupted length of time that the first axle temperature is below a low temperature threshold; tracking an uninterrupted length of time that the second axle temperature is below the low temperature threshold; and stop circulating the axle oil in the first axle hydraulic circuit and stop circulating the axle oil in the second axle hydraulic circuit when the tracked uninterrupted length of time that both of the first and second axle temperatures is below the low temperature threshold is greater than a low temperature time duration; where the low temperature threshold is less than the high temperature threshold.

Circulating the axle oil in the first axle hydraulic circuit and circulating the axle oil in the second axle hydraulic circuit can include opening an on/off valve coupled to a first motor; driving the first motor with hydraulic flow through the opened on/off valve; driving a first pump with the first motor; circulating the axle oil in the first axle hydraulic circuit using the first pump; driving a second motor with return flow from the first motor; driving a second pump with the second motor; circulating the axle oil in the second axle hydraulic circuit using the second pump. Stop circulating the axle oil in the first axle hydraulic circuit and stop circulating the axle oil in the second axle hydraulic circuit can include closing the on/off valve which stops flow to the first and second motors.

Circulating the axle oil in the first axle hydraulic circuit and circulating the axle oil in the second axle hydraulic circuit can include opening an on/off valve coupled to the main vehicle hydraulic system; driving a first motor with hydraulic flow from the main vehicle hydraulic system through the opened on/off valve; driving a first pump with the first motor; circulating the axle oil in the first axle hydraulic circuit using the first pump; driving a second motor with return flow from the first motor; driving a second pump with the second motor; circulating the axle oil in the second axle hydraulic circuit using the second pump; returning return flow from the second motor to the main vehicle hydraulic system. Stop circulating the axle oil in the first axle hydraulic circuit and stop circulating the axle oil in the second axle hydraulic circuit can include closing the on/off valve which stops flow to the first and second motors from the main vehicle hydraulic system.

The method can also include circulating axle oil in a third axle hydraulic circuit that passes through a third axle of the vehicle, the third axle hydraulic circuit being a closed-loop hydraulic system, and the third axle hydraulic circuit not sharing hydraulic fluid with the main vehicle hydraulic system. In this case, the method can also include cooling the axle oil in the third axle hydraulic circuit as it circulates in the third axle hydraulic circuit monitoring a third axle temperature that indicates a temperature of the axle oil in the third axle hydraulic circuit as it passes through the third axle, tracking an uninterrupted length of time that each of the first, second and third axle temperatures exceeds a high temperature threshold; and tracking an uninterrupted length of time that each of the first, second and third axle temperatures is below a low temperature threshold, the low temperature threshold being less that the high temperature threshold. When the tracked uninterrupted length of time that at least one of the first, second and third axle temperatures exceeds the high temperature threshold is greater than the high temperature time duration, the method can also include opening an on/off valve coupled to a first motor, driving the first motor with hydraulic flow through the opened on/off valve, driving a first pump with the first motor, circulating the axle oil in the first axle hydraulic circuit using the first pump, driving a second motor with return flow from the first motor, driving a second pump and a third pump with the second motor, circulating the axle oil in the second axle hydraulic circuit using the second pump, and circulating the axle oil in the third axle hydraulic circuit using the third pump. When the tracked uninterrupted length of time that all of the first, second and third axle temperatures is below the low temperature threshold is greater than a low temperature time duration, the method can also include closing the on/off valve which stops flow to the first and second motors.

With a third axle hydraulic circuit and an on/off valve coupled to the main vehicle hydraulic system, the method can include, when the tracked uninterrupted length of time that at least one of the first, second and third axle temperatures exceeds the high temperature threshold is greater than the high temperature time duration, performing the steps of opening the on/off valve coupled to the main vehicle hydraulic system, driving a first motor with hydraulic flow from the main vehicle hydraulic system through the opened on/off valve, driving a first pump with the first motor, circulating the axle oil in the first axle hydraulic circuit using the first pump, driving a second motor with return flow from the first motor, driving a second pump and a third pump with the second motor, circulating the axle oil in the second axle hydraulic circuit using the second pump, circulating the axle oil in the third axle hydraulic circuit using the third pump and returning return flow from the second motor to the main vehicle hydraulic system. When the tracked uninterrupted length of time that all of the first, second and third axle temperatures is below the low temperature threshold is greater than a low temperature time duration, the method can include closing the on/off valve which stops flow to the first and second motors from the main vehicle hydraulic system.

BRIEF DESCRIPTION OF THE DRAWINGS

The above-mentioned aspects of the present disclosure and the manner of obtaining them will become more apparent and the disclosure itself will be better understood by reference to the following description of exemplary embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

A temperature controlled axle cooling and filtration system can be designed to turn on or off depending on the temperature of the vehicle, for example an articulated dump truck (ADT). For ADTs, heat is primarily generated in the axles during braking and high speed transport operations. The axle cooling system can remain inactive until the axle oil reaches a given temperature threshold. When the axle oil reaches the given temperature threshold, the axle cooling system can activate and supply cooling to the vehicle axles as needed to ensure the axles do not overheat.

Figure 1:
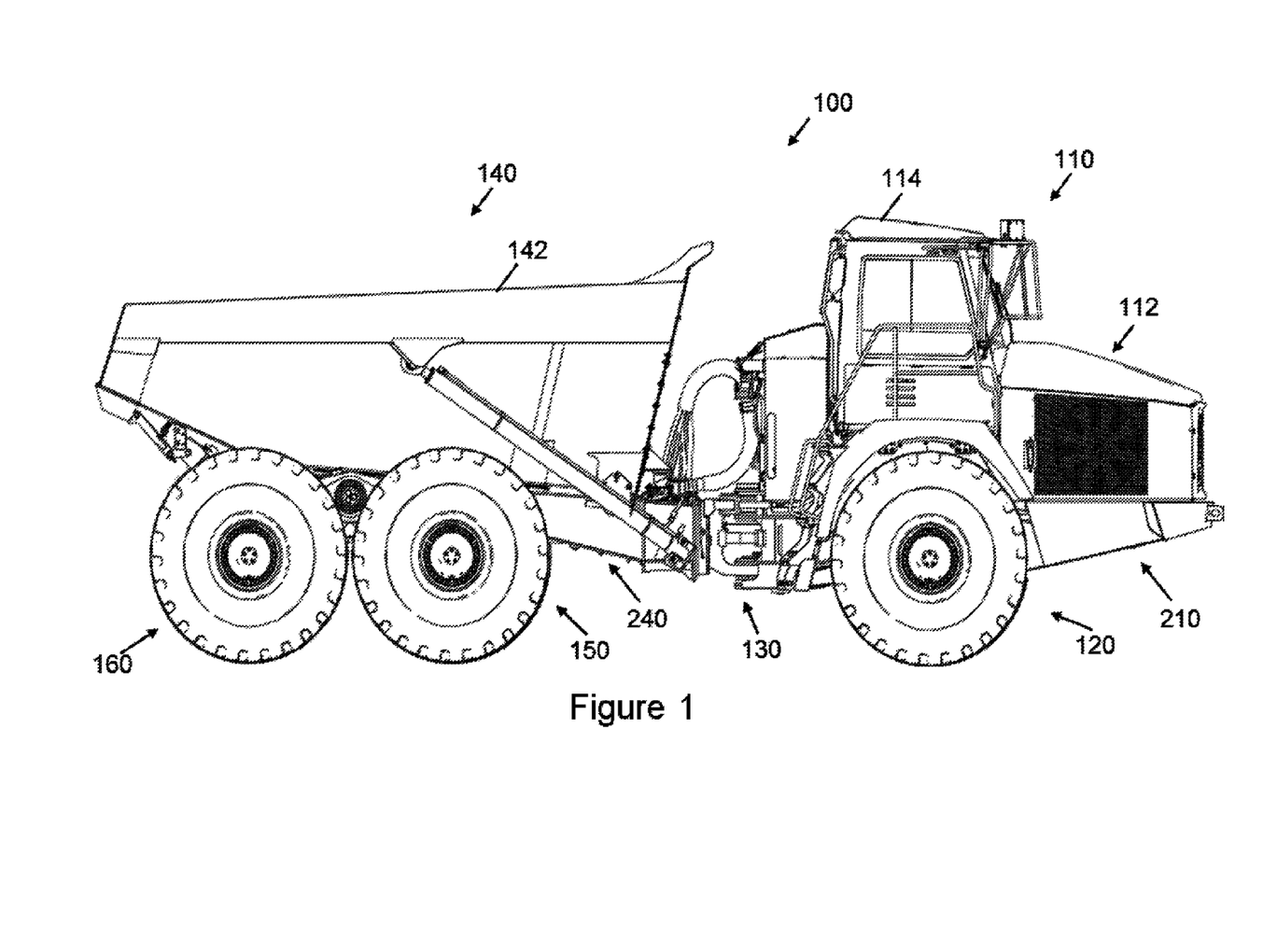
FIG. 1 illustrates an exemplary vehicle having an engine and multiple axles.

FIG. 1 illustrates an exemplary dump vehicle 100 including a power head section 110 and a load carrying section 140. The power head section 110 includes a vehicle engine or motor 112, an operator cab 114 and a front axle and wheels 120 which are all coupled to a front frame 210. The load carrying section 140 includes a dump body 142, a mid-axle and wheels 150 and a rear axle and wheels 160 which are all coupled to a rear frame 240. The front frame 210 of the power head section 110 is coupled to the rear frame 240 of the load carrying section 140 by articulation and oscillation joints 130. The articulation joint enables the power head section 110 and the load carrying section 140 to pivot relative to one another about a vertical axis for steering the vehicle 100, and the oscillation joint allows the power head section 110 and the load carrying section 140 to rotate relative to one another about a longitudinal axis extending along the length of the vehicle 100.

Figure 2:
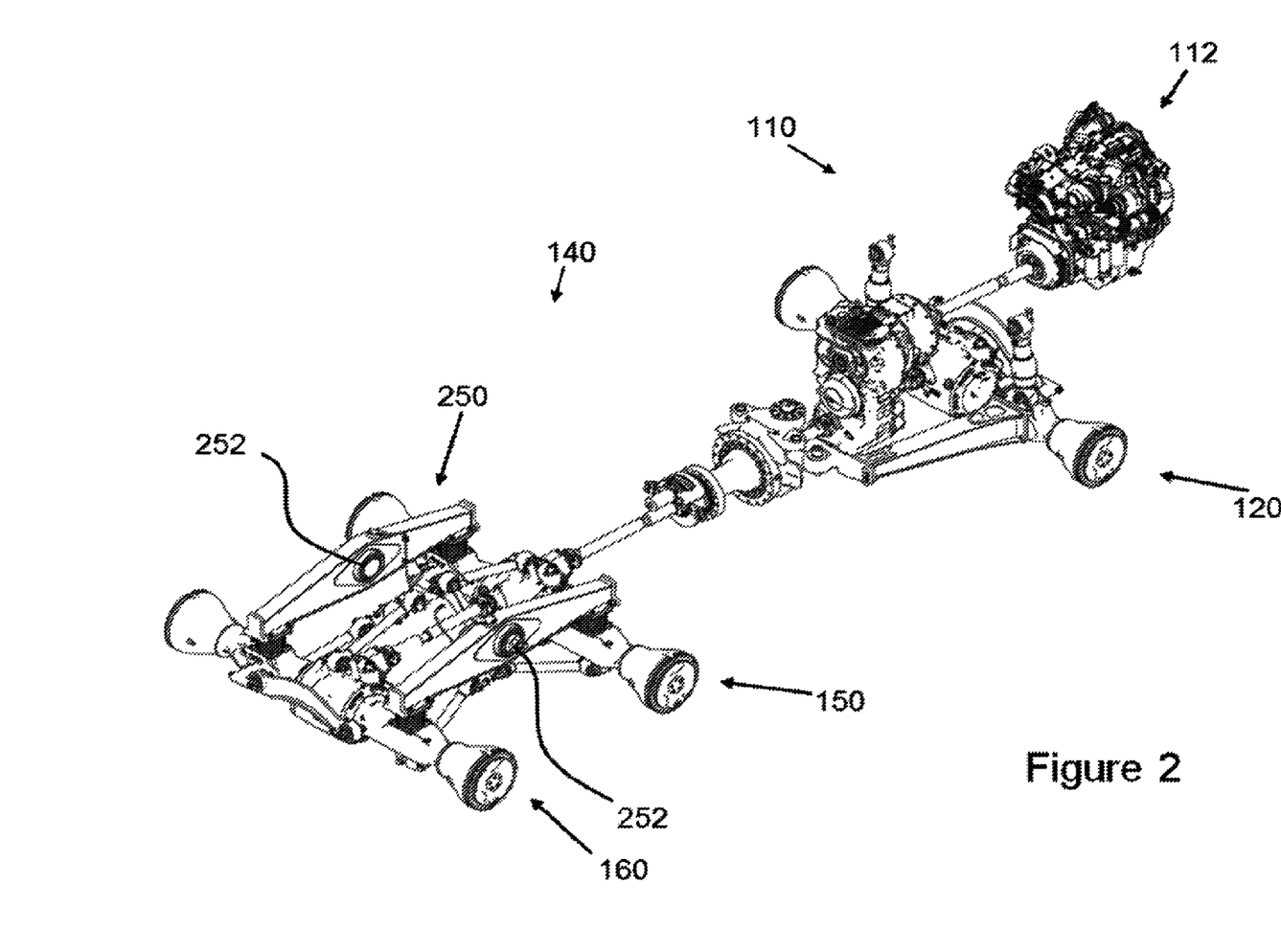
FIG. 2 illustrates a schematic of an exemplary arrangement of front and rear axles of a vehicle.

FIG. 2 illustrates exemplary front and rear axle arrangements for the power head section 110 and load carrying section 140, respectively, of a dump vehicle 100. The exemplary embodiment of FIG. 2 includes a bogie axle arrangement 250 connected to the rear frame 240. In this embodiment, the mid-axle 150 and the rear axle 160 are connected in the bogie axle arrangement 250, and the bogie axle arrangement 250 is connected by a bogie pivot joint 252 to the rear frame 240. The bogie pivot joint 252 is located between the mid-axle 150 and the rear axle 160. The bogie pivot joint 252 of the bogie axle arrangement 250 allows the mid-axle 150 and the rear axle 160 to pivot about an axis running through the bogie pivot joint 252 that is perpendicular to the rear frame 240 which enables the mid and rear axles and wheels 150, 160 to have a different inclination angle than the rear frame 240.

An axle cooling system can include temperature sensors, on/off solenoid valves, motors, pumps, filters, and control system. The temperature sensors can be positioned in the axles that monitor the temperature of the axle oil in each axle. When the axle oil reaches a threshold temperature, the axle cooling system can open a valve to send flow to one or more motor pumps mounted to a frame of the vehicle. The axle cooling system can include a front motor pump mounted to the front frame of the vehicle, and a rear motor pump mounted to the rear frame of the vehicle. Each motor pump includes a motor that drives one or more pumps. The main hydraulic system of the vehicle can provide the flow for the motors of the motor pumps, and the motors can drive the pumps of the motor pumps to circulate axle oil to the axles. The front motor pump can circulate axle oil through a closed front axle oil circuit. The return flow from the motor of the front motor pump can drive the motor of the rear motor pump, which in turn can circulate axle oil through one or more closed rear axle oil circuits using one or more pumps. Each one of the axle oil circuits can be a closed system to prevent cross axle contamination. The return flow and case drain lines from each motor of the motor pumps can be sent back to a hydraulic tank of the main vehicle hydraulic system. The flow in each of the axle oil circuits circulates the axle oil to cool and filter the axles and axle oil. The main hydraulic system of the vehicle refers to the vehicle hydraulic system that drives implement movement (for example a dump body, boom, bucket, etc.) and performs other primary hydraulic functions of the vehicle.

Figure 3:
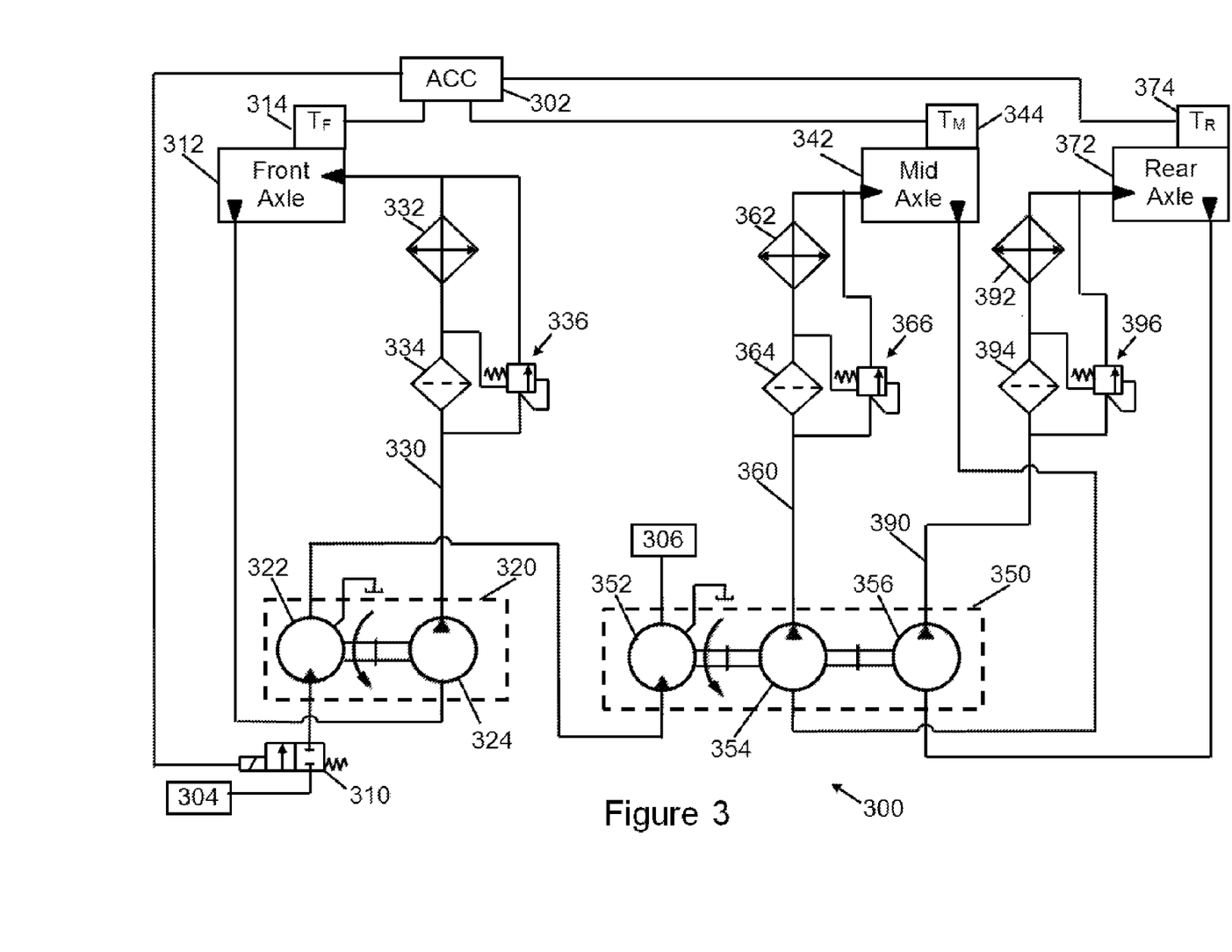
FIG. 3 illustrates an exemplary embodiment of an axle oil cooling system for cooling a front axle, a mid-axle, and a rear axle of a vehicle.

FIG. 3 illustrates an exemplary embodiment of an axle cooling system 300 for cooling a front axle 312, a mid-axle 342, and a rear axle 372 of a vehicle. The axle cooling system 300 includes an axle cooling controller 302, an on/off solenoid valve 310, a front axle temperature sensor 314, a mid-axle temperature sensor 344, a rear axle temperature sensor 374, a front axle closed-loop hydraulic circuit 330, a mid-axle closed-loop hydraulic circuit 360, a rear axle closed-loop hydraulic circuit 390, a front motor/pump 320 and a rear motor/pump/pump 350. The front motor/pump 320 includes a front motor 322 that drives a front pump 324 that, when activated, pumps axle oil through the front axle closed-loop hydraulic circuit 330. The rear motor/pump/pump 350 includes a rear motor 352 that drives a mid-pump 354 and a rear pump 356. When the mid-pump 354 is activated, it pumps axle oil through the mid-axle closed-loop hydraulic circuit 360. When the rear pump 356 is activated, it pumps axle oil through the rear axle closed-loop hydraulic circuit 390.

The front axle temperature sensor 314 monitors the temperature of the axle oil circulating in the front axle hydraulic circuit 330 as it flows through the front axle 312. The mid-axle temperature sensor 344 monitors the temperature of the axle oil circulating in the mid-axle hydraulic circuit 360 as it flows through the mid-axle 344. The rear axle temperature sensor 374 monitors the temperature of the axle oil circulating in the rear axle hydraulic circuit 390 as it flows through the rear axle 372. The temperature sensors can directly measure the axle oil temperature or can measure a related temperature and the axle cooling controller 302 can model the associated axle oil temperature. The readings from the temperature sensors 314, 344, 374 are received by the axle cooling controller 302 which controls the on/off solenoid valve 310.

The front axle hydraulic circuit 330 also includes a front axle cooler 332, and can optionally include a front axle filter 334 and/or a front axle pressure relief bypass circuit 336. The front axle pressure relief bypass circuit 336 can bypass the front axle filter 334, or can bypass both the front axle filter 334 and the front axle cooler 332. The mid-axle hydraulic circuit 360 also includes a mid-axle cooler 362, and can optionally include a mid-axle filter 364 and/or a mid-axle pressure relief bypass circuit 366. The mid-axle pressure relief bypass circuit 366 can bypass the mid-axle filter 364, or can bypass both the mid-axle filter 364 and the mid-axle cooler 362. The rear axle hydraulic circuit 390 also includes a rear axle cooler 392, and can optionally include a rear axle filter 394 and/or a rear axle pressure relief bypass circuit 396. The rear axle pressure relief bypass circuit 396 can bypass the rear axle filter 394, or can bypass both the rear axle filter 394 and the rear axle cooler 392.

Hydraulic fluid from the main vehicle hydraulic system is pumped to an axle cooling circuit input 304. The axle cooling controller 302 can keep the on/off solenoid valve 310 closed until one or more of the axle temperature sensors 314, 344, 374 goes above a threshold temperature (for example, 70° C.). When the on/off solenoid valve 310 is closed, flow from the axle cooling circuit input 304 is blocked, keeping the motor/pumps 320, 350 inactive, which conserves vehicle fuel and power that would be needed to drive them. If the axle temperature sensors 314, 344, 374 stay below the threshold temperature for an extended period of time, the axle cooling controller 302 can open the on/off solenoid valve 310 for a predetermined time duration to filter the axle oil in the closed-loop axle hydraulic circuits 330, 360, 390.

When one or more of the axle temperature sensors 314, 344, 374 goes above a high threshold temperature, the axle cooling controller 302 can open the on/off solenoid valve 310. The axle cooling controller 302 can open the on/off solenoid valve 310 based on the highest of the axle temperature readings, or an average axle temperature reading, or other triggering event.

When the axle cooling controller 302 opens the on/off solenoid valve 310, hydraulic fluid from the main vehicle hydraulic system flows through the axle cooling circuit input 304 and the on/off valve 310 to activate the front motor 322 which drives the front pump 324. The return flow from the front motor 322 activates the rear motor 352 which drives the mid-pump 354 and the rear pump 356. The return flow from the rear motor 352 then flows to an axle cooling circuit output 306 where it continues to circulate through the main vehicle hydraulic system. In this embodiment, hydraulic fluid from the main vehicle hydraulic system only flows through the on/off valve 310, the front motor 322 and the rear motor 352 of the axle cooling system 300. The return flow and case drain lines from the motors 322, 352 can be sent back to a hydraulic tank of the main vehicle hydraulic system. In this embodiment, hydraulic fluid from the main vehicle hydraulic system does not enter the front axle hydraulic circuit 330, the mid-axle hydraulic circuit 360 or the rear axle hydraulic circuit 390; and each of the front, mid and rear axle hydraulic circuits 330, 360, 390 is a separate hydraulic circuit.

When the front motor 322 drives the front pump 324, the front pump 324 pumps axle oil through the closed-loop front axle hydraulic circuit 330. In the embodiment of FIG. 3, the front pump 324 pumps axle oil through the front axle filter 334 which filters the axle oil and then through the front axle cooler 332 which cools the axle oil and then through the front axle 312. After passing through the front axle 312, the axle oil circulates back to the front pump 324 to be recirculated through the front axle hydraulic circuit 330. If the front axle filter 334 or front axle cooler 332 becomes clogged and hydraulic pressure builds in the front axle hydraulic circuit 330, the front axle pressure relief bypass circuit 336 can activate to permit flow around the front axle filter 334 and/or the front axle cooler 332 to lower hydraulic pressure in the front axle hydraulic circuit 330.

When the rear motor 352 drives the mid-pump 354, the mid-pump 354 pumps axle oil through the closed-loop mid-axle hydraulic circuit 360. In the embodiment of FIG. 3, the mid-pump 354 pumps axle oil through the mid-axle filter 364 which filters the axle oil and then through the mid-axle cooler 362 which cools the axle oil and then through the mid-axle 342. After passing through the mid-axle 342, the axle oil circulates back to the mid-pump 354 to be recirculated through the mid-axle hydraulic circuit 360. If the mid-axle filter 364 or mid-axle cooler 362 becomes clogged and hydraulic pressure builds in the mid-axle hydraulic circuit 360, the mid-axle pressure relief bypass circuit 366 can activate to permit flow around the mid-axle filter 364 and/or the mid-axle cooler 362 to lower hydraulic pressure in the mid-axle hydraulic circuit 360.

When the rear motor 352 drives the rear pump 356, the rear pump 356 pumps axle oil through the closed-loop rear axle hydraulic circuit 390. In the embodiment of FIG. 3, the rear pump 356 pumps axle oil through the rear axle filter 394 which filters the axle oil and then through the rear axle cooler 392 which cools the axle oil and then through the rear axle 372. After passing through the rear axle 372, the axle oil circulates back to the rear pump 356 to be recirculated through the rear axle hydraulic circuit 390. If the rear axle filter 394 or rear axle cooler 392 becomes clogged and hydraulic pressure builds in the rear axle hydraulic circuit 390, the rear axle pressure relief bypass circuit 396 can activate to permit flow around the rear axle filter 394 and/or the rear axle cooler 392 to lower hydraulic pressure in the rear axle hydraulic circuit 390.

In the embodiment of FIG. 3, each one of the axle oil hydraulic circuits 330, 360, 390 is a closed system to prevent cross axle contamination; and the flow in each of the axle oil hydraulic circuits 330, 360, 390 circulates the axle oil to cool and filter the axles and axle oil. Alternative embodiments could enable the flow of axle oil between one or more of the axles, for example the mid and rear axles 342, 372 could have a single hydraulic circuit with a single pump that circulates axle oil through both axles, and filters and cools the axle oil and both axles.

Alternatively, the axle cooling system could have an independent motor/pump for each axle with separate on/off valves for each motor/pump and separate inputs and outputs to the main vehicle hydraulic system. In this alternative embodiment, when the axle temperature of any one of the axles exceeds a threshold temperature (which could be different for each axle), the on/off valve for that axle could be opened to activate the motor/pump and cause circulation of axle oil through that axle oil circuit for that axle, without activating the other motor/pumps and axle oil circuits.

These and other variations can be easily derived from the present disclosure by those of ordinary skill in the art.

Figure 4:
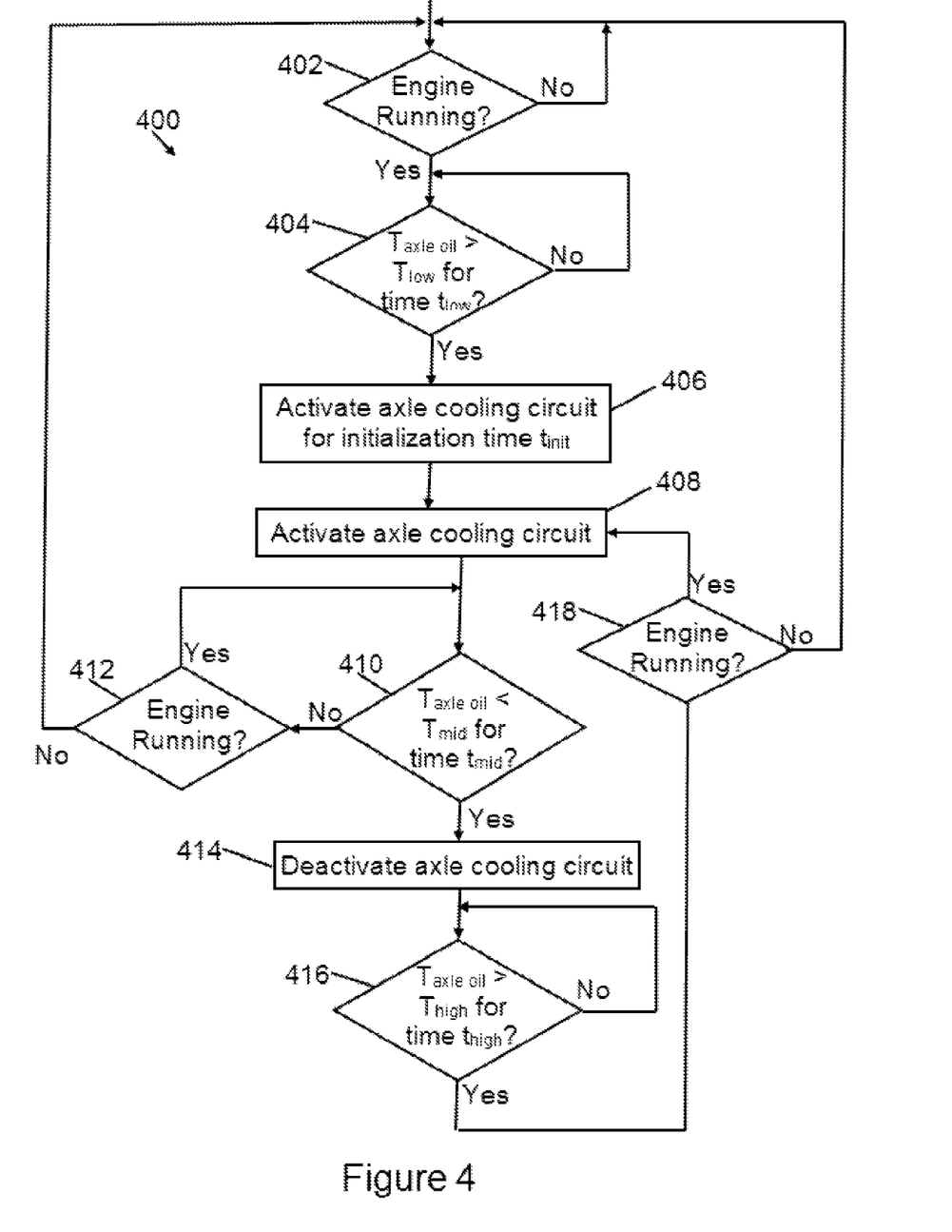
FIG. 4 illustrates an exemplary control process that can be implemented in an axle cooling controller for an axle cooling system.

FIG. 4 illustrates an exemplary control process that can be implemented in an axle cooling controller for an axle cooling system. This exemplary embodiment uses three threshold temperatures for the axle oil and four time durations. More or less temperature thresholds and time durations can be implemented in the control flow as desired for the situation.

At block 402, the axle cooling system is not activated and the process waits until the engine is running. When the engine is running, control passes to block 404. At block 404, the axle cooling controller checks if the axle oil temperature has been greater than a lower temperature threshold $T_{low}$ for an uninterrupted length of time of at least a low temperature time duration $t_{low}$. The controller checks periodically and waits at block 404 until the axle oil temperature has been greater than $T_{low}$ for an uninterrupted length of time of at least the low temperature time duration $t_{low}$, at which point control passes to block 406. At block 406, the axle cooling controller activates the axle cooling circuit for an initialization time $t_{init}$. After the initialization time $t_{init}$, control passes to block 408 where the axle cooling circuit remains activated.

At block 408, the axle cooling circuit is activated or remains active. From block 408, control passes to block 410 where the controller checks whether the axle oil temperature has been less than a middle temperature threshold $T_{mid}$ for an uninterrupted length of time equal to or greater than a middle temperature time duration $t_{mid}$. If the axle oil temperature has been less than the middle temperature threshold $T_{mid}$ for at least an uninterrupted length of time equal to the middle temperature time duration $t_{mid}$, then control passes to block 414 where the axle cooling circuit is deactivated. Otherwise control passes to block 412 where the controller checks if the engine is running. If the engine is no longer running, then control returns to block 402. If the engine is still running, then control returns to block 410 where the controller continues to track axle oil temperatures and the uninterrupted time duration that the axle oil temperature has been less than the middle temperature threshold $T_{mid}$.

At block 414, the axle cooling circuit is deactivated, and control passes to block 416. At block 416, the controller checks whether the axle oil temperature has been greater than a higher temperature threshold $T_{high}$ for at least an uninterrupted length of time of a high temperature time duration $t_{high}$. If the axle oil temperature has been greater than the higher temperature threshold $T_{high}$ for an uninterrupted length of time of at least the high temperature time duration $t_{high}$, then control passes to block 418. Otherwise control stays at block 416 where the controller continues to track axle oil temperatures and the uninterrupted length of time that the axle oil temperature has been greater than the higher temperature threshold $T_{high}$.

At block 418, the controller checks if the engine is still running. If the engine is no longer running, then control returns to block 402. If the engine is still running, then control passes to block 408 where the axle cooling circuit is activated.

The axle oil temperature thresholds can be selected based on the optimal temperature range for the axle oil. For example, if the axle oil is thick and produces noticeable friction at temperatures below 50° C., and has a preferred operating temperature range from 60° C. to 70° C.; then temperature thresholds of $t_{low}$=50° C., $T_{mid}$=60° C. and $T_{high}$=70° C. could be selected. Also by way of example and not limitation, time durations of $t_{init}$=15 minutes, $f_{low}$=60 seconds, $t_{mid}$=60 seconds and $t_{high}$=10 seconds could be selected.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A temperature controlled axle cooling system for an axle of a vehicle, the temperature controlled axle cooling system comprising:
    an axle hydraulic circuit that passes through the axle;
    a pump that circulates axle oil through the axle hydraulic circuit;
    an axle oil cooler that cools the axle oil as it circulates through the axle hydraulic circuit;
    a temperature sensor that monitors an axle temperature of the axle;
    wherein when the temperature sensor indicates that the axle temperature is above a high axle temperature threshold, the pump is activated to circulate axle oil through the axle hydraulic circuit.

2. The temperature controlled axle cooling system of claim 1, wherein when the temperature sensor indicates that the axle temperature is below a low axle temperature threshold, the pump is deactivated.

3. The temperature controlled axle cooling system of claim 2, further comprising:
    an axle oil filter that filters the axle oil as it circulates through the axle hydraulic circuit; and
    a bypass circuit that monitors a hydraulic pressure in the axle hydraulic circuit between the pump and the axle oil filter;
    wherein when the hydraulic pressure is less than a pressure threshold, the axle oil circulates through the axle oil filter; and when the hydraulic pressure is not less than the pressure threshold, the axle oil bypasses the axle oil filter.

4. A temperature controlled axle cooling system for a vehicle having a main vehicle hydraulic system, a first axle and a second axle, the temperature controlled axle cooling system comprising:
    a first axle hydraulic circuit that passes through the first axle;
    a second axle hydraulic circuit that passes through the second axle;
    a first pump that circulates axle oil through the first axle hydraulic circuit;
    a second pump that circulates axle oil through the second axle hydraulic circuit;
    a first axle oil cooler that cools the axle oil as it circulates through the first axle hydraulic circuit;
    a second axle oil cooler that cools the axle oil as it circulates through the second axle hydraulic circuit;
    a first temperature sensor that monitors a first axle temperature of the first axle;
    a second temperature sensor that monitors a second axle temperature of the second axle;

wherein the first and second pumps are activated to circulate axle oil through the first and second axle hydraulic circuits based on the first and second axle temperatures.

5. The temperature controlled axle cooling system of claim 4, wherein the first axle hydraulic circuit is a closed-loop hydraulic system, the second axle hydraulic circuit is a separate closed-loop hydraulic system, and neither the first or second axle hydraulic circuits shares hydraulic fluid with the main vehicle hydraulic system.

6. The temperature controlled axle cooling system of claim 5, further comprising an axle cooling system controller that receives first axle temperature readings from the first temperature sensor and second axle temperature readings from the second temperature sensor, and
wherein the axle cooling system controller activates both the first and second pumps when either of the first or second axle temperature readings is above a high axle temperature threshold.

7. The temperature controlled axle cooling system of claim 6, wherein the axle cooling system controller deactivates both the first and second pumps when both the first and second axle temperature readings are below a low axle temperature threshold, the low axle temperature threshold being less than the high axle temperature threshold.

8. The temperature controlled axle cooling system of claim 6, further comprising:
a first motor coupled to the first pump to drive the first pump;
a second motor coupled to the second pump to drive the second pump; and
an on/off valve coupled to the first motor;
wherein when either of the first or second axle temperature readings is above the high axle temperature threshold, the axle cooling system controller opens the on/off valve which activates the first motor which drives the first pump, and return flow from the first motor activates the second motor which drives the second pump.

9. The temperature controlled axle cooling system of claim 8, wherein the on/off valve is coupled to the main vehicle hydraulic system; and when the on/off valve opens hydraulic fluid flow from the main vehicle hydraulic system flows through the on/off valve, powers the first and second motors and returns to the main vehicle hydraulic system.

10. The temperature controlled axle cooling system of claim 5, further comprising an axle cooling system controller that receives first axle temperature readings from the first temperature sensor and second axle temperature readings from the second temperature sensor, and
wherein the axle cooling system controller activates the first pump when the first axle temperature reading is above a first high axle temperature threshold; and the axle cooling system controller activates the second pump when the second axle temperature reading is above a second high axle temperature threshold.

11. The temperature controlled axle cooling system of claim 5, wherein the vehicle further comprises a third axle; and the temperature controlled axle cooling system further comprises:
a third axle hydraulic circuit that passes through the third axle, the third axle hydraulic circuit being a separate closed-loop hydraulic system, and the third axle hydraulic circuit not sharing hydraulic fluid with the main vehicle hydraulic system;
a third pump that circulates axle oil through the third axle hydraulic circuit;
a third axle oil cooler that cools the axle oil as it circulates through the third axle hydraulic circuit;
a third temperature sensor that monitors a third axle temperature of the third axle;
an axle cooling system controller that receives first axle temperature readings from the first temperature sensor, second axle temperature readings from the second temperature sensor and third axle temperature readings from the third temperature sensor;
a first motor coupled to the first pump to drive the first pump;
a second motor coupled to the second and third pumps to drive the second and third pumps; and
an on/off valve coupled to the first motor;
wherein when either of the first, second or third axle temperature readings is above a high axle temperature threshold, the axle cooling system controller opens the on/off valve which activates the first motor which drives the first pump, and return flow from the first motor activates the second motor which drives the second and third pumps.

12. The temperature controlled axle cooling system of claim 11, wherein the on/off valve is coupled to the main vehicle hydraulic system; and when the on/off valve opens hydraulic fluid flow from the main vehicle hydraulic system flows through the on/off valve, powers the first and second motors and return flow from the second motor returns to the main vehicle hydraulic system.

13. A temperature based method for controlling an axle cooling system for a vehicle having a main vehicle hydraulic system, a first axle and a second axle, the method comprising:
circulating axle oil in a first axle hydraulic circuit that passes through the first axle;
circulating axle oil in a second axle hydraulic circuit that passes through the second axle;
cooling the axle oil in the first axle hydraulic circuit as it circulates in the first axle hydraulic circuit;
cooling the axle oil in the second axle hydraulic circuit as it circulates in the second axle hydraulic circuit;
monitoring a first axle temperature that indicates a temperature of the axle oil in the first axle hydraulic circuit as it passes through the first axle;
monitoring a second axle temperature that indicates a temperature of the axle oil in the second axle hydraulic circuit as it passes through the second axle; and
circulating the axle oil in the first axle hydraulic circuit and circulating the axle oil in the second axle hydraulic circuit based on the first and second axle temperatures.

14. The method of claim 13, wherein circulating axle oil in the first and second axle hydraulic circuits based on the first and second axle temperatures comprises:
tracking an uninterrupted length of time that the first axle temperature exceeds a high temperature threshold;
tracking an uninterrupted length of time that the second axle temperature exceeds the high temperature threshold; and
circulating the axle oil in the first axle hydraulic circuit and circulating the axle oil in the second axle hydraulic circuit when the tracked uninterrupted length of time that at least one of the first and second axle temperatures exceeds the high temperature threshold is greater than a high temperature time duration.

15. The method of claim 14, further comprising:
tracking ah uninterrupted length of time that the first axle temperature is below a low temperature threshold, the low temperature threshold being less than the high temperature threshold;
tracking an uninterrupted length of time that the second axle temperature is below the low temperature threshold;
stop circulating the axle oil in the first axle hydraulic circuit and stop circulating the axle oil in the second axle hydraulic circuit when the tracked uninterrupted length of time that both of the first and second axle temperatures is below the low temperature threshold is greater than a low temperature time duration.

16. The method of claim 15, wherein the first axle hydraulic circuit is a closed-loop hydraulic system, the second axle hydraulic circuit is a separate closed-loop hydraulic system, and neither the first or second axle hydraulic circuits shares hydraulic fluid with the main vehicle hydraulic system.

17. The method of claim 16, wherein circulating the axle oil in the first axle hydraulic circuit and circulating the axle oil in the second axle hydraulic circuit comprises:
opening an on/off valve coupled to a first motor;
driving the first motor with hydraulic flow through the opened on/off valve;
driving a first pump with the first motor;
circulating the axle oil in the first axle hydraulic circuit using the first pump;
driving a second motor with return flow from the first motor;
driving a second pump with the second motor;
circulating the axle oil in the second axle hydraulic circuit using the second pump; and
wherein stop circulating the axle oil in the first axle hydraulic circuit and stop circulating the axle oil in the second axle hydraulic circuit comprises closing the on/off valve which stops flow to the first and second motors.

18. The method of claim 16, wherein circulating the axle oil in the first axle hydraulic circuit and circulating the axle oil in the second axle hydraulic circuit comprises:
opening an on/off valve coupled to the main vehicle hydraulic system;
driving a first motor with hydraulic flow from the main vehicle hydraulic system through the opened on/off valve;
driving a first pump with the first motor;
circulating the axle oil in the first axle hydraulic circuit using the first pump;
driving a second motor with return flow from the first motor;
driving a second pump with the second motor;
circulating the axle oil in the second axle hydraulic circuit using the second pump;
returning return flow from the second motor to the main vehicle hydraulic system; and
wherein stop circulating the axle oil in the first axle hydraulic circuit and stop circulating the axle oil in the second axle hydraulic circuit comprises closing the on/off valve which stops flow to the first and second motors from the main vehicle hydraulic system.

19. The method of claim 13, wherein the first axle hydraulic circuit is a closed-loop hydraulic system, the second axle hydraulic circuit is a separate closed-loop hydraulic circuits shares hydraulic fluid with the main vehicle hydraulic system; and the method further comprises:
circulating axle oil in a third axle hydraulic circuit that passes through a third axle of the vehicle, the third axle hydraulic circuit being a separate closed-loop hydraulic system, and the third axle hydraulic circuit not sharing hydraulic fluid with the main vehicle hydraulic system;
cooling the axle oil in the third axle hydraulic circuit as it circulates in the third hydraulic circuit;
monitoring a third axle temperature that indicates a temperature of the axle oil in the third axle hydraulic circuit as it passes through the third axle;
tracking an uninterrupted length of time that each of the first, second and third axle temperatures exceeds a high temperature threshold; and
tracking an uninterrupted length of time that each of the first, second and third axle temperatures is below a low temperature threshold, the low temperature threshold being less that the high temperature threshold;
when the tracked uninterrupted length of time that at least one of the first, second and third axle temperatures exceeds the high temperature threshold is greater than a high temperature time duration, performing the following steps:
opening an on/off valve coupled to a first motor;
driving the first motor with hydraulic flow through the opened on/off valve;
driving a first pump with the first motor;
circulating the axle oil in the first axle hydraulic circuit using the first pump;
driving a second motor with return flow from the first motor;
driving a second pump and a third pump with the second motor;
circulating the axle oil in the second axle hydraulic circuit using the second pump; and
circulating the axle oil in the third axle hydraulic circuit using the third pump; and
when the tracked uninterrupted length of time that all of the first, second and third axle temperatures is below the low temperature threshold is greater than a low temperature time duration, closing the on/off valve which stops flow to the first and second motors.

20. The method of claim 13, wherein the first axle hydraulic circuit is a closed-loop hydraulic system, the second axle hydraulic circuit is a separate closed-loop hydraulic system, and neither the first or second axle hydraulic circuits shares hydraulic fluid with the main vehicle hydraulic system; and the method further comprises:
circulating axle oil in a third axle hydraulic circuit that passes through a third axle of the vehicle, the third axle hydraulic circuit being a separate closed-loop hydraulic system, and the third axle hydraulic circuit not sharing hydraulic fluid with the main vehicle hydraulic system;
cooling the axle oil in the third axle hydraulic circuit as it circulates in the third hydraulic circuit;
monitoring a third axle temperature that indicates a temperature of the axle oil in the third axle hydraulic circuit as it passes through the third axle;
tracking an uninterrupted length of time that each of the first, second and third axle temperatures exceeds a high temperature threshold;
tracking an uninterrupted length of time that each of the first, second and third axle temperatures is below a low temperature threshold, the low temperature threshold being less that the high temperature threshold;

when the tracked uninterrupted length of time that at least one of the first, second and third axle temperatures exceeds the high temperature threshold is greater than a high temperature time duration, performing the following steps:
opening an on/off valve coupled to the main vehicle hydraulic system;
driving a first motor with hydraulic flow from the main vehicle hydraulic system through the opened on/off valve;
driving a first pump with the first motor;
circulating the axle oil in the first axle hydraulic circuit using the first pump;
driving a second motor with return flow from the first motor;
driving a second pump and a third pump with the second motor;
circulating the axle oil in the second axle hydraulic circuit using the second pump;
circulating the axle oil in the third axle hydraulic circuit using the third pump;
returning return flow from the second motor to the main vehicle hydraulic system; and
when the tracked uninterrupted length of time that all of the first, second and third axle temperatures is below the low temperature threshold is greater than a low temperature time duration, closing the on/off valve which stops flow to the first and second motors from the main vehicle hydraulic system.

\* \* \* \* \*